United States Patent
Miller et al.

(10) Patent No.: US 6,708,047 B1
(45) Date of Patent: Mar. 16, 2004

(54) DEVICE FOR REDUCING RADIATION FROM AN ANTENNA OF A PORTABLE TELEPHONE

(76) Inventors: Jack Miller, 216 Fairview Ave., Englewood Cliffs, NJ (US) 07632; Michael Miller, 2055 Center Ave., Apt. 15J, Fort Lee, NJ (US) 07024

( * ) Notice: Subject to any disclaimer, the term of this patent is extended or adjusted under 35 U.S.C. 154(b) by 595 days.

(21) Appl. No.: 09/765,556

(22) Filed: Jan. 19, 2001

(51) Int. Cl.[7] ............................................. H01Q 11/12
(52) U.S. Cl. ........................... 455/575.5; 455/575.1; 455/90.3; 455/117; 455/129; 455/106; 455/301; 343/702; 343/841
(58) Field of Search ............................ 455/575.1, 575.5, 455/575.8, 90.1, 90.3, 347–349, 19, 25, 117, 129, 106, 300, 301; 343/702, 721, 841

(56) References Cited

U.S. PATENT DOCUMENTS

| | | | |
|---|---|---|---|
| 4,189,730 A | * | 2/1980 | Murdock ................... 343/841 |
| 5,335,366 A | * | 8/1994 | Daniels ...................... 455/89 |
| 5,373,304 A | * | 12/1994 | Nolan et al. ................ 343/841 |
| 5,666,125 A | * | 9/1997 | Luxon et al. ............... 343/702 |
| 6,097,340 A | * | 8/2000 | Chang ........................ 343/702 |
| 6,292,151 B1 | * | 9/2001 | Wu ............................. 343/721 |
| 6,314,277 B1 | * | 11/2001 | Hsu et al. ................... 455/117 |
| 2001/0041545 A1 | * | 11/2001 | Liberman et al. .......... 455/117 |

* cited by examiner

*Primary Examiner*—Vivian Chin
*Assistant Examiner*—Tuan Tran
(74) *Attorney, Agent, or Firm*—Richard M. Goldberg

(57) ABSTRACT

A device for reducing radiation from an antenna of a portable telephone, includes a main body having an outer body with a central bore, and an antenna gripping member mounted in the bore and having an antenna receiving opening for receiving the antenna of the telephone; a radiation reducing lead shield mounted to an outer surface of the main body and extending only partially therearound for reducing electromagnetic radiation from the antenna to a person using the telephone; a cover body in surrounding relation to the main body and the radiation reducing shield, and including a cover opening in alignment with the antenna receiving opening; and indicia on the cover body for indicating an orientation of the main body on the antenna such that the radiation reducing shield is positioned on a side of the antenna which is opposite from the earpiece speaker.

19 Claims, 2 Drawing Sheets

DEVICE FOR REDUCING RADIATION FROM AN ANTENNA OF A PORTABLE TELEPHONE

BACKGROUND OF THE INVENTION

The present invention relates to portable cellular or wireless telephones, and more particularly, to a device for reducing radiation to a user of a cellular telephone.

Cellular telephones have recently exploded onto the marketplace for a number of reasons, such as availability of better cellular reception and more expansive coverage areas, lower prices, smaller telephones and more competition. Hand-held cellular telephones, once considered a luxury, have now become a business and personal necessity. It is estimated that more than 500 million people worldwide use mobile telephones.

However, cellular telephones emit electromagnetic radiation. When a portable cellular telephone is positioned close to a person's ear during communication, electromagnetic radiation from the antenna is directed toward the user's head. For example, tests were performed by the inventors herein with the electromagnetic field radiation meter sold by Applied Magnetics Laboratory Inc., 1404 Bare Hills Road, Baltimore, Md. 21209 under Model No. EMF-931. A telephone call was made on a cellular telephone and it was found that the radiation from either the microphone or earpiece speaker was in the range of about 3–5 milligauss, while the electromagnetic radiation from the antenna was about 50 milligauss.

In view of the above, there is a large public concern that such radiation can cause health risks, such as brain tumors or other ill effects. Although no research has clearly shown these health risks, the concerns still exist. For example, the British government recently launched a package of safety precautions for cellular telephones, including leaflets in which the chief medical officers for England, Wales, Scotland and Northern Ireland strongly advise that children under the age of 16 be discouraged from using cellular telephones at all, and if they have to use the handsets, to keep all calls of a short duration. Further, the leaflets advise that, to minimize exposure to radio waves, users keep calls short and consider relative radio wave values when purchasing new cellular telephones.

OBJECTS AND SUMMARY OF THE INVENTION

Accordingly, it is an object of the present invention to provide a device for reducing radiation from an antenna of a portable telephone that overcomes the problems with the aforementioned prior art.

It is another object of the present invention to provide such a device that fits over the antenna of the portable telephone.

It is still another object of the present invention to provide such a device in which the radiation reducing shield of the device is positioned in partially surrounding relation to the antenna on a side of the antenna which is opposite from the earpiece speaker.

In accordance with an aspect of the present invention, a device for reducing radiation from an antenna of a portable telephone of the type having an earpiece speaker positioned adjacent the antenna, includes a main body having an antenna receiving opening for receiving the antenna of the telephone; a radiation reducing shield mounted to the main body and extending only partially around the main body for reducing electromagnetic radiation from the antenna to a head of a person using the telephone; and indicia on the device for indicating an orientation of the main body on the antenna such that the radiation reducing shield is positioned on a side of the antenna which is opposite from the earpiece speaker.

The main body is made from a material that grips the antenna when the antenna is received in the opening, and preferably includes a closed cell foam rubber material. Specifically, the main body includes an outer body having a bore extending therethrough and an antenna gripping member mounted in the bore of the outer body and having the opening for receiving the antenna therein. The outer body is made from a material having a greater hardness than a material of the antenna gripping member. Preferably, the outer body is made from a neoprene spring rubber material and the antenna gripping member is made from the aforementioned closed cell foam rubber material.

The radiation reducing shield is made from a lead material, and preferably, from an antimonial lead sheet. Preferably, the radiation reducing shield extends around the main body for an arcuate length of about 140 degrees. In such case, the main body has a cylindrical configuration, and the radiation reducing shield has a part cylindrical configuration.

A cover body is provided in surrounding relation to the main body and the radiation reducing shield, the cover body including a cover opening in alignment with the antenna receiving opening. Specifically, the cover body includes an upper cup-shaped half which fits over an upper half of the main body and radiation reducing shield and a lower cup-shaped half which fits over a lower half of the main body and radiation reducing shield, with the lower cup-shaped half having a bottom wall with the cover opening therein. The cover body is preferably made from a PVC material.

In accordance with another aspect of the present invention, a device for reducing radiation from an antenna of a portable telephone of the type having an earpiece speaker positioned adjacent the antenna, includes a main body including an outer body having a bore extending therethrough, and an antenna gripping member mounted in the bore of the outer body and having an antenna receiving opening for receiving the antenna of the telephone therein; a radiation reducing lead shield mounted to the main body and extending only partially around the main body for reducing electromagnetic radiation from the antenna to a head of a person using the telephone; a cover body in surrounding relation to the main body and the radiation reducing shield, the cover body including a cover opening in alignment with the antenna receiving opening; and indicia on the cover body for indicating an orientation of the main body on the antenna such that the radiation reducing shield is positioned on a side of the antenna which is opposite from the earpiece speaker.

The above and other objects, features and advantages of the invention will become readily apparent from the following detailed description thereof which is to be read in connection with the accompanying drawings.

DETAILED DESCRIPTION

Figure 1:
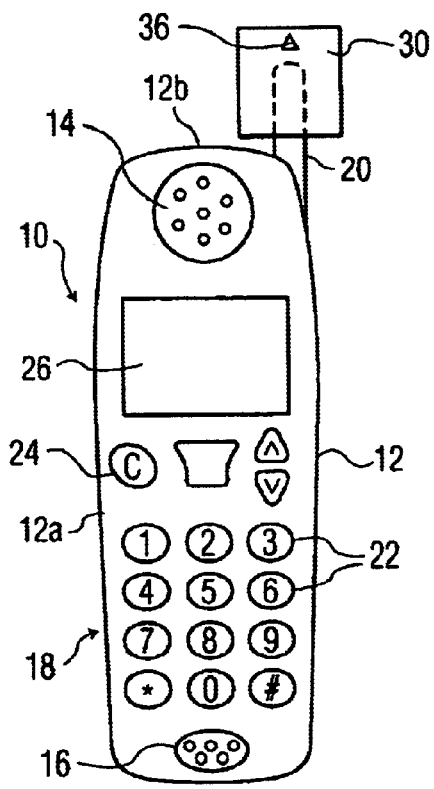
FIG. 1 is a front elevational view of a portable cellular telephone with the device for reducing radiation according to the present invention mounted on the antenna of the portable telephone.

Referring to the drawings in detail, and initially to FIG. 1 thereof, a conventional cellular telephone 10 is shown to include a housing 12 having telephony circuitry (not shown) therein. Cellular telephone 10 includes an earpiece speaker 14, a microphone 16, a keypad 18 extending from a front face 12a of housing 12 and a stub antenna 20 extending from an upper end 12b of housing 12. Keypad 18 includes numeric keys 22, including number keys 0 through 9, a star (*) key and a pound (#) key as provided on most telephones, as well as control keys 24 for transmitting a dialed telephone number, clearing previously dialed telephone numbers, ending the transmission, turning cellular phone 10 on and off and so on.

Cellular telephone 10 also includes a display 26, such as an LCD or LED display, which displays information such as the telephone number dialed, the power status, the calling status and the like, as is conventional.

As discussed above, a relatively large amount of electromagnetic radiation is emitted from stub antenna 20 of cellular telephone 10.

In this regard, a device 30 for reducing radiation from stub antenna 20 of portable telephone 10 includes a main body 32 for mounting on antenna 20 of telephone 10; a radiation reducing shield 34 mounted to main body 32 and extending only partially around main body 32 for reducing electromagnetic radiation from antenna 20 to a head of a person using telephone 10; and indicia 36 on the device for indicating the orientation of main body 32 on stub antenna 20 such that radiation reducing shield 34 is positioned to a side of antenna 20 which is opposite from earpiece speaker 14.

Main body 32 preferably has a cylindrical. configuration, although the present invention is not limited thereby. Specifically, main body 32 includes a cylindrical outer body 38 made from any suitably strong, and preferably non-metal material. Cylindrical outer body 38 is preferably made from a neoprene spring rubber having a high tensile strength of about 1200 psi, a Shore A durometer hardness of about 75 and which is made of a blend of neoprene rubber and EPDM (ethylene propylene diene monomer) rubber. Cylindrical outer body 38 includes an inner central axial bore 40. Although not limited thereto, cylindrical outer body 38 preferably has a height of about 3.8 mm, an outside diameter of about 2.5 mm and an inner bore diameter of about 1.5 mm, thereby providing a wall thickness of about 0.5 mm.

Main body 32 further includes a cylindrical antenna gripping member 42 fixedly mounted within central axial bore 40 by any suitable means, such as a friction fit, adhesive or the like. Antenna gripping member 42 has an inner central axial bore 44 and is made from a material that will provide a releasable gripping action with stub antenna 20. For example, antenna gripping member 42 is preferably made from a closed cell foam rubber material. With this arrangement, device 30 can be pushed or twisted onto stub antenna 20 and will be held thereon, until the user twists or pulls device 30 off from antenna 20. However, device 30 will not accidentally slip off of antenna 20. This is because antenna 20 compresses antenna gripping member 42 when fit therein. Although not limited thereto, antenna gripping member 42 preferably has a height of about 3.8 mm, an outside diameter of about 1.5 mm and an inner bore diameter of about 0.7 mm, thereby providing a wall thickness of about 0.4 mm.

Radiation reducing shield 34 has a part cylindrical shape so as to extend partially on the outer surface of cylindrical outer body 38, and can be fixed thereon by, an adhesive or any other suitable means. Radiation reducing shield 34 preferably extends the entire length of cylindrical outer body 38 but only about a partial arcuate angle thereof, for example, 140 degrees, although the present invention is not limited thereto. Alternatively, radiation reducing shield 34 can be embedded in cylindrical outer body 38, and reference to radiation reducing shield 34 being mounted to main body 32 in the claims refers to mounting of radiation reducing shield 34 to a surface of main body 32 or embedded therein.

Radiation reducing shield 34 is made from any suitable radiation shielding material, but preferably is made from an antimonial hard lead sheet material. When lead and antimony are combined, the result is an alloy that is much harder than general purpose lead. Specifically, antimonial lead has a greater mechanical strength and approximately twice the tensile strength of lead at room temperature.

Further, it is preferable that device 30 includes a cover body 46 for enclosing radiation reducing shield 34, cylindrical outer body 38 and antenna gripping member 42. In a preferred embodiment, cover body 46 is formed by cylindrical upper and lower cup-shaped cover halves 48 and 50. Upper cover half 48 includes an annular wall 52 which is closed at its upper end by a circular top wall 54. Thus, upper cover half 48 fits over the upper half of radiation reducing shield 34, cylindrical outer body 38 and antenna gripping member 42. Lower cover half 50 includes an annular wall 56 which is closed at its lower end by a circular bottom wall 58. Thus, lower cover half 50 fits over the lower half of radiation reducing shield 34, cylindrical outer body 38 and antenna gripping member 42, such that the open lower edge 60 of upper half 48 and the open upper edge 62 of lower cover half 50 abut against each other. Upper and lower cover halves 48 and 50 can be friction fit thereover, and in this regard, ribs or the like can be provided on the interior walls thereof. Alternatively, upper and lower cover halves 48 and 50 can be secured in position by any suitable means, such as adhesive or the like. In addition, circular bottom wall 58 of lower cover half 50 includes a central opening 64 therein which is in alignment with inner central axial bore 44 of antenna gripping member 42 in order to permit mounting of device 10 on antenna 20. Further, slits 70 are preferably provided to extend radially outward from opening 64 to permit large diameter antennas to be fit therethrough without damaging the cover half. Alternatively, circular top wall 54 can include a central opening 55 (shown in dashed lines) therein which is in alignment with inner central axial bore 44 of antenna gripping member 42 in order to permit mounting of device 10 on antenna 20. However, opening 55 would have a different dimension than opening 64 to permit a different diameter antenna to be held therein. Preferably, upper and lower cover halves 48 and 50 are made from a slightly flexible material that permits easy mounting of upper and lower cover halves 48 and 50 over radiation reducing shield 34, cylindrical outer body 38 and antenna gripping member 42. A preferred material for upper and lower cover halves 48 and 50 is flexible PVC (polyvinyl chloride). In order to aid in such flexibility, upper and lower cover halves 48 and 50 preferably have a reduced thickness wall, for example, in the range of 1–2 mm.

Figure 2:
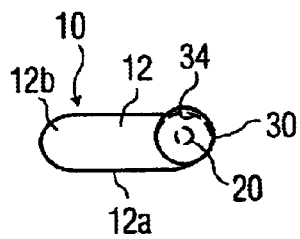
FIG. 2 is a top plan view of the portable cellular telephone with the device for reducing radiation of FIG. 1.

It is an important aspect of the present invention that, when device 30 is mounted on antenna 20, radiation reducing shield 34 be positioned in partially surrounding relation to antenna 20 on a side of antenna 20 which is opposite from earpiece speaker 14, as shown best in FIG. 2. It would normally be expected that radiation reducing shield 34 should be placed between the user's head and antenna 20. However, the inventors herein have discovered an unexpected result when radiation reducing shield 34 is positioned on the side of antenna 20 which is opposite the user's head and earpiece speaker 14. In this regard, a telephone call was made on cellular telephone 10 with device 30 mounted on antenna 20. When radiation reducing shield 34 was positioned as shown in FIG. 2, that is, on the side of antenna 20 which is opposite the user's head and earpiece speaker 14, and the electromagnetic radiation level at the position of the user's ear was measured with the aforementioned Model No. EMF-931 electromagnetic field radiation meter, the electromagnetic radiation was reduced from a level of about 50 milliGauss without device 30 mounted on antenna 20 to a level which varied in the range of about 1.0–2.5 milliGauss. However, when device 30 was rotated on antenna 20 by 180 degrees so that radiation reducing shield 34 was positioned between the antenna 20 and the person's ear, the measured radiation level only reduced to a level which varied in the range of about 15–16 milliGauss. Thus, the radiation level with device 30 of the present invention oriented in the manner shown in FIG. 2 resulted in a radiation level even below that of the 3–5 milliGauss level at earpiece speaker 14 or microphone 16. Further, in the tests that were performed, no noticeable change in reception of the signal was noted with device 30 mounted on antenna 20.

Tests were performed in the same manner by an independent laboratory, which resulted in the following power levels in milliwatts per gram of brain tissue (mW/g), which is related to radiation levels, for different frequencies of the cellular telephone. Table I shows the power levels without the present invention and Table II shows the power levels with the present invention oriented and configured as discussed above.

TABLE I

CELLULAR TELEPHONE USE WITHOUT PRESENT INVENTION

| Signal Frequency | 825 MHz | 835 MHz | 849 MHz |
|---|---|---|---|
| Power measurement at face (Mw/g) | 0.419 | 0.510 | 0.556 |

TABLE II

CELLULAR TELEPHONE USE WITH PRESENT INVENTION

| Signal Frequency | 825 MHz | 835 MHz | 849 MHz |
|---|---|---|---|
| Power measurement at face (Mw/g) | 0.054 | 0.043 | 0.008 |

It will therefore be appreciated that the present invention substantially reduces the electromagnetic radiation to the person using the cellular telephone. Further, it was determined that this is accomplished without any significant loss in the signal, that is, the person is able to hear the caller in the same manner with or without the present invention applied.

Figure 3:
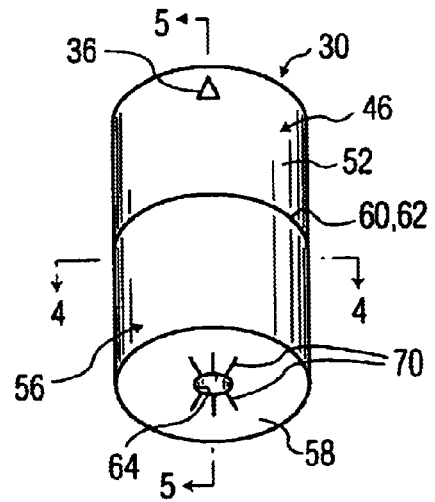
FIG. 3 is a perspective view of the radiation reducing device.
Figure 4:
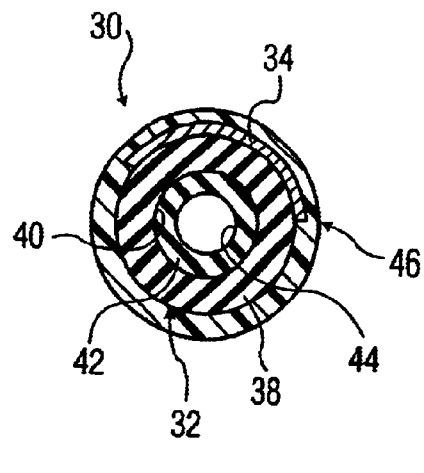
FIG. 4 is a cross-sectional view of the radiation reducing device of FIG. 3, taken along line 4—4 thereof.
Figure 5:
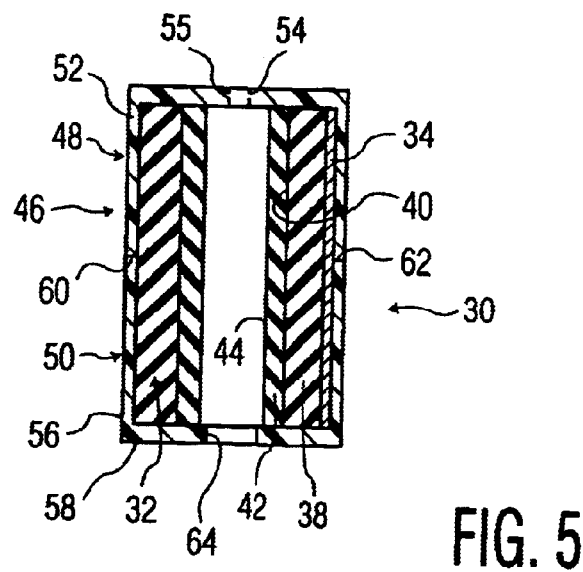
FIG. 5 is a cross-sectional view of the radiation reducing device of FIG. 3, taken along line 5—5 thereof.
Figure 6:
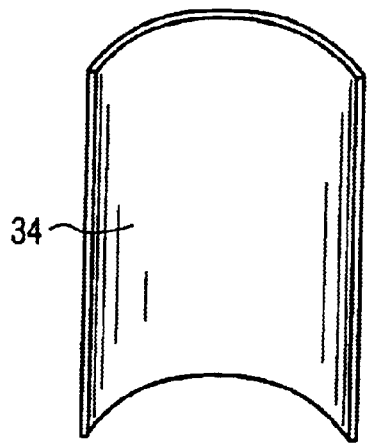
FIG. 6 is a perspective view of the radiation reducing shield of the device.

In order to achieve this correct orientation of radiation reducing shield 34, device 30 preferably includes indicia 36 thereon. Indicia 36 can include any marking on the outer surface of cover body 46, as shown in FIGS. 1 and 3.

It will therefore be appreciated that device 30 substantially reduces radiation from antenna 20 to a user of cellular telephone 10 in an unexpected manner.

Having described a specific preferred embodiment of the invention with reference to the accompanying drawings, it will be appreciated that the present invention is not limited to that precise embodiment and that various changes and modifications can be effected therein by one of ordinary skill in the art without departing from the scope or spirit of the invention defined by the appended claims.

What is claimed is:

1. A device for reducing radiation from an antenna of a portable telephone of the type having an earpiece speaker positioned adjacent the antenna, comprising:

a main body having an antenna receiving opening for receiving the antenna of the telephone;

a radiation reducing shield mounted to the main body and extending only partially around said main body for reducing electromagnetic radiation from the antenna to a head of a person using the telephone; and indicia on the device for indicating an orientation of the main body on the antenna such that the radiation reducing shield is positioned on a side of the antenna which is opposite from the earpiece speaker.

2. A device according to claim 1, wherein said main body is made from a material that grips the antenna when the antenna is received in said opening.

3. A device according to claim 2, wherein said material includes a closed cell foam rubber material.

4. A device according to claim 1, wherein said main body includes an outer body having a bore extending therethrough and an antenna gripping member mounted in the bore of the outer body and having said opening for receiving the antenna therein.

5. A device according to claim 4, wherein said outer body is made from a material having a greater hardness than a material of said antenna gripping member.

6. A device according to claim 5, wherein said outer body is made from a neoprene spring rubber material and said antenna gripping member is made from a closed cell foam rubber material.

7. A device according to claim 1, wherein said radiation reducing shield is made from a lead material.

8. A device according to claim 1, wherein said radiation reducing shield is made from an antimonial lead sheet.

9. A device according to claim 1, wherein said radiation reducing shield extends around said main body for an arcuate length of about 140 degrees.

10. A device according to claim 1, wherein said main body has a cylindrical configuration, and said radiation reducing shield has a part cylindrical configuration.

11. A device according to claim 1, further comprising a cover body in surrounding relation to said main body and said radiation reducing shield, said cover body including a cover opening in alignment with said antenna receiving opening.

12. A device according to claim 11, wherein said cover body includes an upper cup-shaped half which fits over an upper half of said main body and radiation reducing shield and a lower cup-shaped half which fits over a lower half of said main body and radiation reducing shield, with said lower cup-shaped half having a bottom wall with said cover opening therein.

13. A device according to claim 11, wherein said cover body is made from a PVC material.

14. A device for reducing radiation from an antenna of a portable telephone of the type having an earpiece speaker positioned adjacent the antenna, comprising:

a main body including:
  an outer body having a bore extending therethrough, and
  an antenna gripping member mounted in the bore of the outer body and having an antenna receiving opening for receiving the antenna of the telephone therein;

a radiation reducing lead shield mounted to an outer surface of the main body and extending only partially around said main body for reducing electromagnetic radiation from the antenna to a head of a person using the telephone;

a cover body in surrounding relation to said main body and said radiation reducing shield, said cover body including a cover opening in alignment with said antenna receiving opening; and indicia on the cover body for indicating an orientation of the main body on the antenna such that the radiation reducing shield is positioned on a side of the antenna which is opposite from the earpiece speaker.

15. A device according to claim 14, wherein said outer body is made from a neoprene spring rubber material and said antenna gripping member is made from a closed cell foam rubber material.

16. A device according to claim 14, wherein said radiation reducing shield extends around said main body for an arcuate length of about 140 degrees.

17. A device according to claim 14, wherein said main body has a cylindrical configuration, and said radiation reducing shield has a part cylindrical configuration.

18. A device according to claim 14, wherein said cover body includes an upper cup-shaped half which fits over an upper half of said main body and radiation reducing shield and a lower cup-shaped half which fits over a lower half of said main body and radiation reducing shield, with said lower cup-shaped half having a bottom wall with said cover opening therein.

19. A device according to claim 14, wherein said cover body is made from a PVC material.

\* \* \* \* \*